United States Patent [19]
Shirakawa et al.

[11] Patent Number: 5,332,059
[45] Date of Patent: Jul. 26, 1994

[54] CONTROL SYSTEM FOR A DIFFERENTIAL OF A MOTOR VEHICLE

[75] Inventors: Kiminaga Shirakawa, Yamanashi; Satoru Watanabe, Tokyo; Kouji Matsuno; Kazuya Morota, both of Gunma, all of Japan

[73] Assignee: Fuji Jukogyo Kabushiki Kaisha, Tokyo, Japan

[21] Appl. No.: 869,783

[22] Filed: Apr. 16, 1992

[30] Foreign Application Priority Data

Apr. 26, 1991 [JP] Japan .................................. 3-123036
Apr. 26, 1991 [JP] Japan .................................. 3-123037

[51] Int. Cl.⁵ ............................................. B60K 17/34
[52] U.S. Cl. .................................. 180/197; 180/245; 364/426.03
[58] Field of Search .................... 180/197, 245, 249; 364/426.02, 426.03

[56] References Cited

U.S. PATENT DOCUMENTS

| | | | |
|---|---|---|---|
| 4,874,059 | 10/1989 | Kasegawa | 180/249 |
| 4,953,654 | 9/1990 | Imaseki et al. | 364/426.03 X |
| 4,967,869 | 11/1990 | Nagaoka et al. | 180/197 X |
| 5,071,392 | 12/1991 | Stall et al. | 364/426.03 X |
| 5,119,900 | 6/1992 | Watanabe et al. | 180/245 |
| 5,132,908 | 7/1992 | Eto et al. | 180/197 X |
| 5,178,231 | 1/1993 | Watanabe et al. | 180/197 X |
| 5,183,131 | 2/1993 | Naito | 180/233 |

FOREIGN PATENT DOCUMENTS

| | | |
|---|---|---|
| 61-102321 | 5/1986 | Japan . |
| 62-178434 | 8/1987 | Japan . |
| 64-4537 | 1/1989 | Japan . |
| 1-106737 | 4/1989 | Japan . |

Primary Examiner—Margaret A. Focarino
Assistant Examiner—Victor E. Johnson
Attorney, Agent, or Firm—Martin A. Farber

[57] ABSTRACT

A multiple disk clutch is provided for a rear wheel differential of a vehicle. A restricting torque for the clutch is set by vehicle speed, longitudinal acceleration and lateral acceleration of the vehicle. A large steering angle at a low vehicle speed is detected in accordance with the vehicle speed and a steering angle. In response to the restricting torque and a detected large steering angle at a low vehicle speed, the clutch is operated to reduce a restricting operation for the clutch.

5 Claims, 7 Drawing Sheets

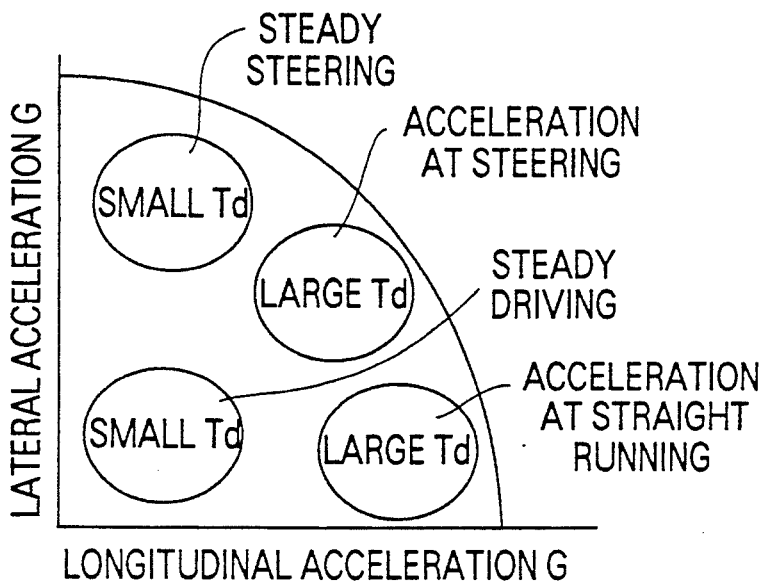
FIG.3
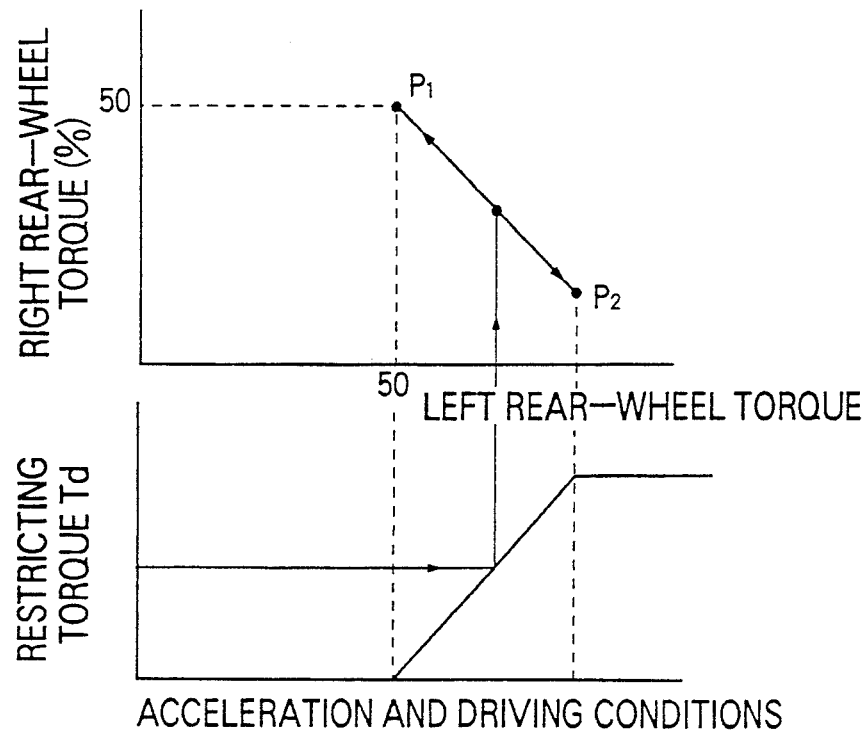
FIG.4 a
FIG.4 b

CONTROL SYSTEM FOR A DIFFERENTIAL OF A MOTOR VEHICLE

BACKGROUND OF THE INVENTION

The present invention relates to a control system of a differential operation restricting device provided on a rear differential of a motor vehicle, and more particularly to the control system for controlling the differential restricting device to restrict a differential operation in accordance with driving conditions of the motor vehicle.

It is known that driving performance of the motor vehicle differs with the type of the power transmission system. For example, a two-wheel drive motor vehicle such as a front-wheel drive vehicle with a front-mounted engine (FF) and a rear-wheel drive vehicle with a front-mounted engine (FR) are more liable to slip on such a bad road as a muddy road than a four-wheel drive motor vehicle. In the FF vehicle, if the vehicle is accelerated at cornering by depressing an accelerator pedal, the front wheels drift due to reduced side force of the front wheels to cause vehicle understeering. If the vehicle is decelerated by releasing the accelerator pedal, engine braking is effected on the front wheels to increase cornering force, causing a tuck-in. In the FR vehicle, if the vehicle is accelerated at cornering the side force of the rear wheels is reduced causing the rear wheels to drift. Thus, the vehicle tends to oversteer. On the other hand, in the four-wheel drive motor vehicle, the four wheels are driven to prevent the wheels from slipping and skidding, thereby improving driving performance in traction, braking, and steering. The acceleration or deceleration influences the front wheels and the rear wheels at the same time, so that both understeer and oversteer of the vehicle are reduced.

Furthermore, in the four-wheel drive motor vehicle, the torque distribution to the front wheels and the rear wheels and to a left rear-wheel and a right rear-wheel affects steerability and running behavior. If the torque distribution is properly controlled, driveability and dynamic stability are further improved. Namely, it is possible to provide a rapid response in an initial state at cornering, to improve the steerability at a low vehicle speed without the braking effect, and at acceleration and deceleration, to improve straight-ahead stability against external disturbance such as cross wind, and to effectively brake the vehicle when an antilock brake system (ABS) is operated. Consequently, it has been proposed to control the torque distribution in accordance with various driving conditions.

Heretofore, a device for restricting the operation of a rear differential is provided for applying a torque for restricting the differential. If the differential restricting device comprises, for example, a fluid operated multiple-disk friction clutch, an electro-magnetic powder clutch or an electro-magnetic operated multiple-disk friction clutch which produces a clutch torque in accordance with a control signal by fluid pressure or current, it is possible to control the restricting torque of the rear differential operation.

A known differential restricting device is arranged to be operated in response to engine torque, namely in dependency on the operation of an accelerator pedal. Thus, the driving torque is effectively transmitted to the rear wheels, thereby improving the straight-ahead stability. However, if the vehicle makes a turn during acceleration, the differential restricting operation causes the vehicle to act during straight running, thereby causing deterioration in steerability.

If a viscous coupling is used as a differential restricting device, which is operable responsive to speed difference between left and right wheels, the steerability is preferably insured because the device is not influenced by the acceleration work. In addition, left or right wheel slipping can be prevented by the viscous coupling. However, the restricting torque of the viscous coupling can not be controlled so as to be changed.

In such a fluid operated multiple disk friction clutch, the clutch torque can be controlled for improving steerability and driveability.

Japanese Patent Application Laid-open 62-178434 discloses a differential restricting device in which the differential operation restricting torque is increased during straight-ahead driving at a higher vehicle speed than a predetermined value and at a smaller steering angle than a predetermined value, thereby improving driving stability. In the system, the torque distribution in a medium speed range is not effectively controlled by the device.

Japanese Patent Application Laid-open 64-4537 discloses a system in which the restricting torque is increased when the left wheel speed and the right wheel speed become equal to each other after the cornering. Japanese Patent Application Laid-open 64-106737 discloses a system in which the cornering radius and the centripetal acceleration are detected to determine conditions of the steering and slipping of the wheels for controlling the restricting torque.

However, in these systems, the restricting torque is controlled in accordance with the driving conditions at straight-ahead driving and at cornering only, so that driving performance at slow or rapid acceleration can not be properly obtained.

Japanese Patent Application Laid-open 61-102321 discloses a system in which the depression degree of the accelerator pedal is detected to control the restricting torque in an increasing function manner, thereby improving accelerability, and also steerability in a light load range. Since the depression degree is differentiated to control the restricting torque, the response of the system in operation is improved.

However, in that system, it is necessary to consider depressing speed and releasing speed of the accelerator pedal as well as the depression degree.

SUMMARY OF THE INVENTION

An object of the present invention is to provide a torque distribution control system for a differential restricting device where differential operation of a rear differential is properly controlled to improve steerability, accelerability and driveability in accordance with driving conditions.

According to the present invention, there is provided a control system for a rear differential mounted on rear axles for rear drive wheels of a motor vehicle having, an engine mounted on said motor vehicle, a transmission connected to said engine, an output member of the transmission operatively connected to the differential for transmitting power from the engine to the rear axles, a differential operation restricting clutch interposed between one of the wheels and one of another of the wheels and the rear differential responsive to a control signal for restricting a differential operation, a wheel speed sensor for detecting rear wheel speed and for generating a rear wheel speed signal, a longitudinal G-sensor for detecting the acceleration in a longitudinal direction of the motor vehicle and for generating a longitudinal acceleration signal, a lateral G-sensor for detecting the acceleration in a lateral direction of said motor vehicle and for generating a lateral acceleration signal, and a steering angle sensor mounted on a front wheel shaft for sensing a steering angle and for producing a steering angle signal.

The system comprises vehicle speed calculating means responsive to the rear wheel speed signal and the longitudinal acceleration signal for calculating a vehicle speed and for producing a vehicle speed signal, torque setting means responsive to the vehicle speed signal, the longitudinal acceleration signal and the lateral acceleration signal for setting a restricting torque of the clutch and for producing a restricting torque signal, slip determining means responsive to the rear wheel speed signal for determining a wheel slip and for producing a slip signal, steering angle determining means responsive to the vehicle speed signal and the steering angle signal for determining a large steering angle at a low vehicle speed and for producing a large steering angle signal, and converting means responsive to the slip signal, the restricting torque signal and the large steering angle signal for setting the control signal of the clutch in order to obtain an optimum control of the clutch so as to improve acceleration performance and traction control.

The other objects and features of the present invention will become understood from the following description with reference to the accompanying drawings.

BRIEF DESCRIPTION OF DRAWINGS

FIG. 3 is a graph showing a differential operation restricting torque corresponding to a longitudinal acceleration G and a lateral acceleration G;

FIG. 4a is a graph showing a relationship between a left rear-wheel torque and a right rear-wheel torque;

FIG. 4b is a graph showing characteristics of the differential operation restricting torque in accordance with acceleration and driving conditions;

FIGS. 6a to 6c are graphs showing the differential operation restricting torque corresponding to a vehicle speed, a throttle valve opening degree, and a throttle valve changing speed, respectively;

DETAILED DESCRIPTION OF THE PREFERRED EMBODIMENTS

Figure 1:
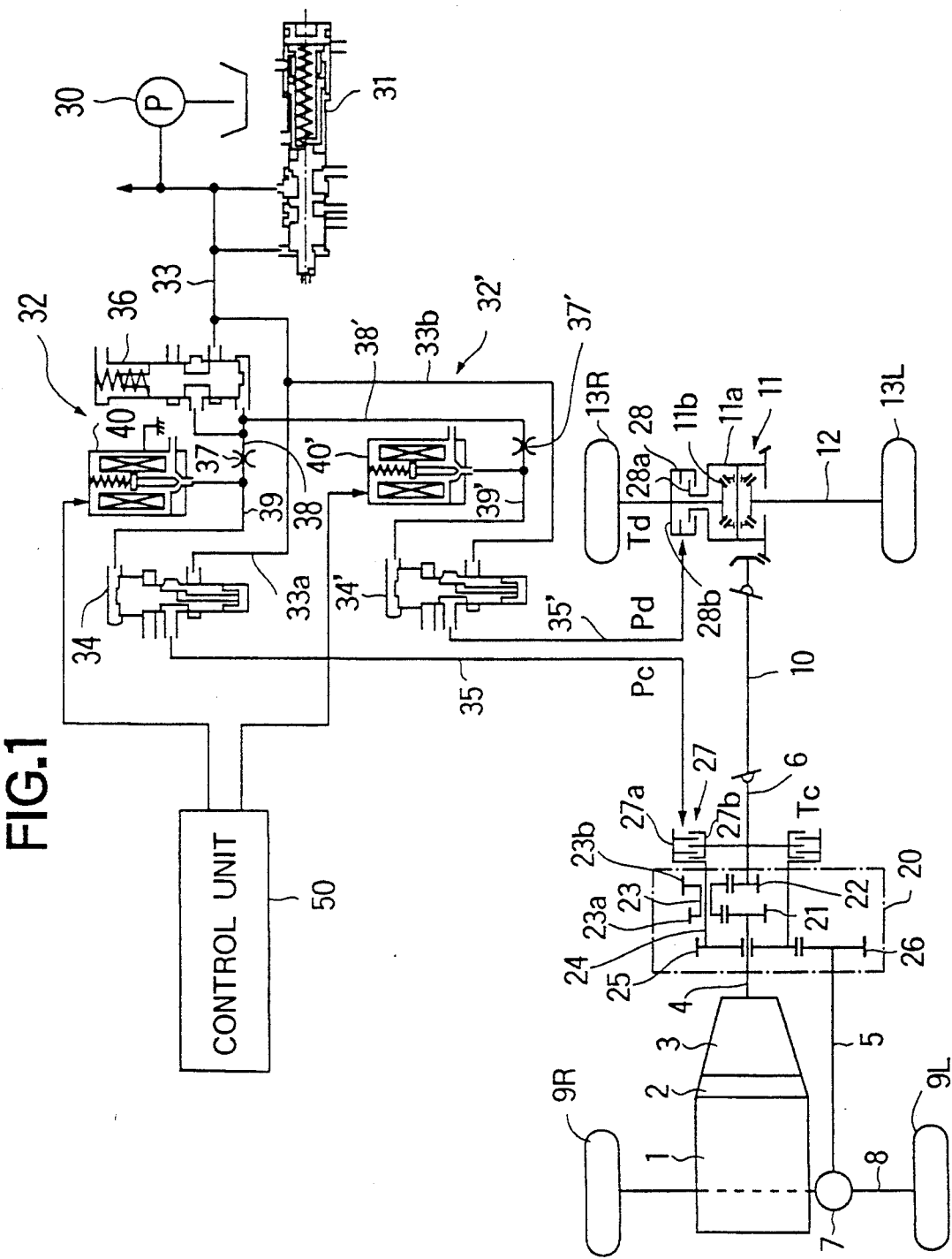
FIG. 1 shows a power transmission system for a four-wheel drive motor vehicle according to the present invention.

FIG. 1 shows a power transmission system for a four-wheel drive motor vehicle having a differential according to the present invention. An engine 1 is mounted on a front portion of the vehicle. A clutch 2 and a transmission 3 are disposed at a rear of the engine 1 in a longitudinal direction of the vehicle. An output of the transmission 3 is transmitted to an output shaft 4 which is aligned with a central differential 20. The output shaft 4 is operatively connected to a front drive shaft 5 which is disposed in parallel under the transmission 3 through a pair of reduction gears 25 and 26 of the central differential 20. The front drive shaft 5 is connected to left and right front wheels 9L and 9R through a front differential 7 and axles 8. The output shaft 4 is connected to a rear drive shaft 6 through the central differential 20. The rear drive shaft 6 is connected to the left and right rear wheels 13L and 13R through a propeller shaft 10, a rear differential 11 and axles 12.

The central differential 20 is a complex planetary gear device and comprises a first sun gear 21 integrally formed on the output shaft 4, a second sun gear 22 integrally formed on the rear drive shaft 6, and a combined planetary pinion 23 comprising a first planetary pinion 23a meshed with the first sun gear 21, and a second planetary pinion 23b meshed with the second sun gear 22, and supported on a carrier 24. The carrier 24 is connected to the reduction gear 25.

Thus, an output torque from the output shaft 4 of the transmission 3 is transmitted to the carrier 24 and the second sun gear 22 through the first sun gear 21 and the pinions 23a, 23b at predetermined respective torque distribution ratios. A difference between rotating speeds of the carrier 24 and the second sun gear 22 is absorbed by rotation of the first and second planetary pinions 23a and 23b.

Consequently, a standard torque distribution for a front torque $T_F$ and a rear torque $T_R$ can be set to various values by changing radii of pitch circles of the sun gears 21 and 22 and the pinions 23a and 23b.

Thus, a standard torque distribution ratio et of the front wheels 9L, 9R and the rear wheels 13L, 13R is determined, for example as $$T_F : T_R = 34:66$$

A large standard torque can be distributed to the rear wheels 13L, 13R.

A fluid operated multiple-disk friction clutch 27 is provided adjacent the central differential 20 for restricting the differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheels 9L, 9R, thereby changing the distribution of the torque. The carrier 24 is coupled with the second sun gear 22 when the clutch 27 is entirely engaged, thereby locking the central differential 20.

In the vehicle with the front-mounted engine, a static weight distribution ew of a front dynamic weight WF and a rear dynamic weight WR are determined as follows.

$$WF : WR \approx 62:38$$

When the clutch 27 is directly engaged, a distribution ratio of the front and rear torques is set in accordance with the weight distribution ew. Thus, the torque distribution is controlled in a range between the standard torque distribution ratio et of 34:66 weighted to the rear wheels 13L, 13R and a torque distribution ratio of 62:38, weighted to the front wheels 9L, 9R at complete engagement of the clutch 27 in accordance with the differential operation restricting clutch torque Tc.

The rear differential 11 comprises a bevel gear differential device mounted in a differential case 11a. A fluid operated multiple-disk friction clutch 28 is provided adjacent the rear differential 11 for restricting the differential operation of the differential 11. The clutch 28 comprises a drive drum 28a secured to the differential case 11a, and a driven drum 28b secured to one of the axles 12 connected to a side gear 11b of the differential 11.

When the clutch 28 is released, the torques are equally distributed to the left and right wheels 13L and 13R. When the clutch 28 is engaged, thereby generating a differential operation restricting torque Td, the differential operation of the rear differential 11 is restricted. The torque distribution ratio of the left and right wheels is determined in accordance with left and right dynamic weights W on the left and right wheels 13L and 13R, and a friction coefficient μ of the road surface (W·μ).

A hydraulic circuit for controlling the clutches 27 and 28 will be described hereinafter.

The hydraulic circuit having a control system 32 for the clutch 27 and a control system 32' for the clutch 28 comprises an oil pump 30, and a pressure regulator valve 31. The regulator valve 31 operates to regulate the pressure of oil supplied from the oil pump 30 driven by the engine 1 to produce a line pressure and the line pressure is applied to a line pressure conduit 33. The control system 32 comprises a pilot valve 36, a clutch control valve 34 and a solenoid operated duty control valve 40. The conduit 33 is communicated with a passage 38 through the pilot valve 36. The passage 38 is communicated with the solenoid operated duty control valve 40 downstream of an orifice 37, and with an end of the clutch control valve 34 through a passage 39. The conduit 33 is communicated with the clutch control valve 34 through a passage 33a. The clutch control valve 34 is communicated with the clutch 27 through a passage 35. The solenoid operated valve 40 is operated by pulses from a control unit 50 at a duty ratio determined therein, thereby controlling draining of the oil therefrom to provide a control pressure Pd. The control pressure is applied to the clutch control valve 34 to control the oil supplied to the clutch 27 so as to control the clutch pressure (torque) and hence the differential operation restricting torque Tc.

The control system 32' for the clutch 28 comprises a clutch control valve 34' and a solenoid operated duty control valve 40'. The passage 38 from the pilot valve 36 is communicated with a passage 38' which is communicated with the solenoid operated duty control valve 40' downstream of an orifice 37', and with an end of the clutch control valve 34' through a passage 39'. The conduit 33 is communicated with the clutch control valve 34' through a passage 33b. The clutch control valve 34' is communicated with the clutch 28 through a passage 35'. The solenoid operated valve 40' is operated in the same manner as the solenoid operated valve 40 to provide a control pressure Pd. The control pressure is applied to the clutch control valve 34' to control the oil supplied to the clutch 28 so as to control the clutch pressure (torque) and hence the differential operation restricting torque Td.

Figure 2:
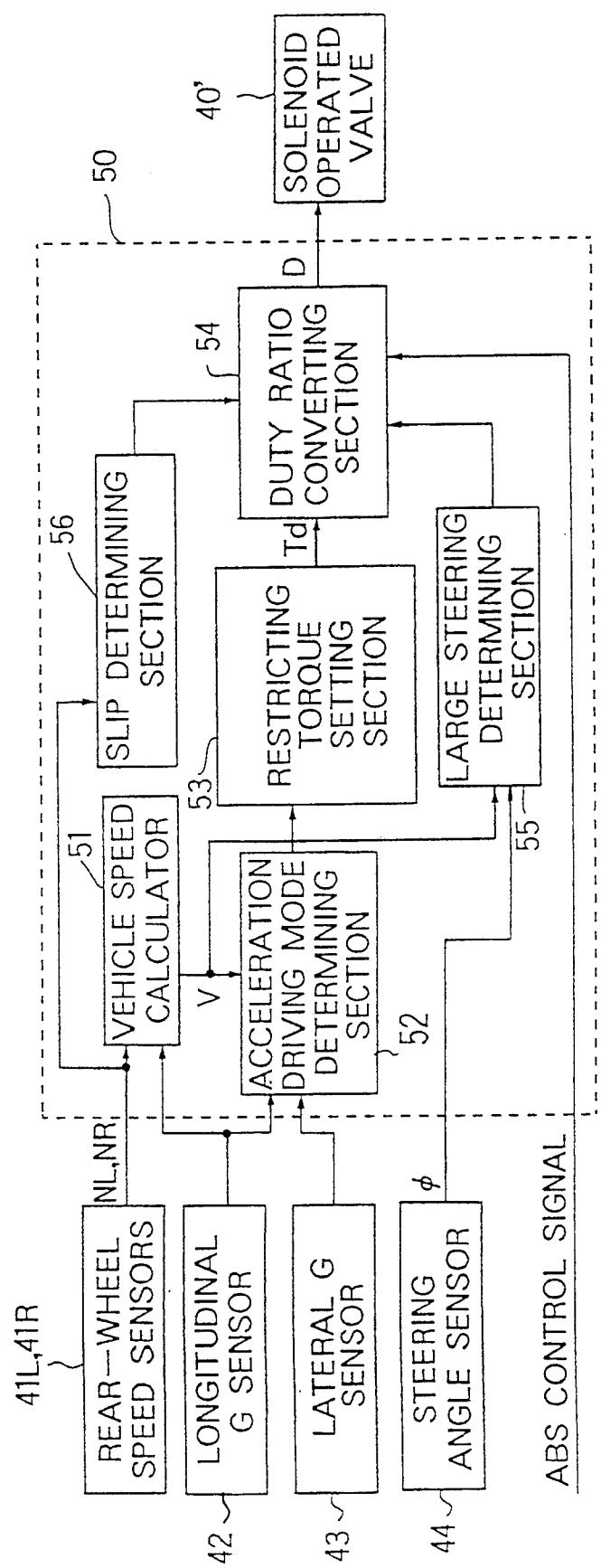
FIG. 2 is a block diagram of a control unit of the system.

Referring to FIG. 2 showing the control unit 50, a system for controlling the clutch torque for restricting the differential operation of the rear differential 11 will be described.

The control unit 50 is provided with a left rear-wheel speed sensor 41L, a right rear-wheel speed sensor 41R for detecting left rear-wheel speed NL and right rear-wheel speed NR of left and right rear wheels 13L and 13R, respectively, a longitudinal G sensor 42 for detecting longitudinal acceleration of the vehicle body, a lateral G sensor 43 for detecting lateral acceleration of the vehicle body, and a steering angle sensor 44 mounted on a front wheel shaft for detecting steering angle φ at cornering.

The control unit 50 has a vehicle speed calculator 51 to which left rear-wheel speed NL and right rear-wheel speed NR from the sensors 41L and 41R and longitudinal acceleration from the sensor 42 are applied. In the vehicle speed calculator 51, the rear-wheel speeds NL and NR, and the longitudinal acceleration are integrated for determining conditions, gripping and slipping of the rear-wheels in accordance with the integrated speed so as to accurately calculate the vehicle speed V. The longitudinal acceleration, lateral acceleration and vehicle speed V are applied to an acceleration driving mode determining section 52. In the section 52, various acceleration and driving modes are determined in accordance with the input signals. If both the longitudinal acceleration and lateral acceleration are small, steady driving is determined. If the longitudinal acceleration is small and the lateral acceleration is large, steady cornering is determined. If the longitudinal acceleration G is large and the lateral acceleration is small, acceleration at straight-ahead running is determined. If both of the accelerations G are large, acceleration at cornering is determined. A determined mode signal is applied to a restricting torque setting section 53. In accordance with the input signal, the torque setting section 53 retrieves a torque Td from a look-up table as shown in FIG. 3. At steady driving or cornering in the steady state, the torque Td is set to a small value. When the vehicle is accelerated at cornering or in the straight-ahead running, the torque Td is set to a large value.

The restricting torque Td is applied to a duty ratio converting section 54 where the torque Td is converted to a corresponding duty ratio D. The duty ratio D provided at the section 54 is applied to the solenoid operated duty control valve 40'.

The control unit 50 has a low-vehicle-speed/large steering determining section 55 to which the vehicle speed V from the vehicle speed calculator 51 and a steering angle φ from the steering angle sensor 44 are applied.

When the vehicle makes a turn at a large steering angle φ and at a low vehicle speed V in the steady state, the section 55 produces a determined signal which is applied to the duty ratio converting section 54. In the section 54, the duty ratio D is forcibly corrected to, for example 100% so as to set the restricting torque Td to zero. If an ABS control signal is fed to the section 54, the duty ratio D is corrected in the same manner. Furthermore, a slipping state determining section 56 is provided in the control unit 50. The left rear-wheel speed NL and the right rear-wheel speed NR are applied to the section 56. In the section 56, the speeds NL and NR are compared and when the difference ΔN between the rear-wheel speeds NL and NR exceeds a predetermined set value, the section 56 determines the slipping state of one of the rear-wheels and produces a signal which is applied to the duty ratio converting section 54 for correcting the duty ratio D to 0% for example so as to set the restricting torque Td to a maximum value.

The operation of the system will be described hereinafter. The power of the engine 1 is transmitted to the transmission 3 through the clutch 2 at which the transmission ratio is controlled. The output of the transmission 3 is transmitted to the first sun gear 21 of the central differential 20. The front torque and the rear torque are determined in accordance with the radii of the gears of the central differential 20 and the clutch torque Tc of the clutch 27 to distribute a larger torque to the rear wheels 13L, 13R than to the front wheels 9L, 9R. The torque is transmitted to the front wheels 9L and 9R through the carrier 24, the reduction drive gear 25, the reduction driven gear 26, the front drive shaft 5 and the front differential 7. The torque is transmitted to the rear wheels 13L, 13R through the second sun gear 22, the rear drive shaft 6, the propeller shaft 10, the rear differential 11 and the rear clutch 28.

If the clutch 27 is disengaged, the clutch torque becomes zero so as to render the central differential 20 free. Accordingly, the torque of the reduction drive gear 25 is transmitted to the front wheels 9L and 9R through the reduction driven gear 26, the front drive shaft 5 and the front differential 7 at the standard torque distribution ratio. Although a full-time four-wheel driving is established, steerability and operability of the vehicle is preferably provided like a rear-drive vehicle with a front-mounted engine.

If the vehicle is driven on a slippery road, the rear wheels slip first because the larger amount of torque is distributed to the rear wheels. Therefore, when the clutch torque Tc is produced in the clutch 27 by the hydraulic control system 32, the clutch 27 is correspondingly connected with the carrier 24 and the second sun gear 22 of the central differential 20. Accordingly, the torque is transmitted from the second sun gear 22 to the carrier 24 to increase the torque to the front wheels. Thus, the torque to the rear wheels is reduced to eliminate slipping, thereby improving driveability to ensure good operability and safe driving.

If the clutch 28 is disengaged and the clutch torque Td becomes zero, the differential 11 is free. Accordingly, the torque is equally transmitted to the left rear-wheel 13L and the right rear-wheel 13R at a point P1 of FIG. 4, thereby improving steerability and driving stability.

When the restricting torque Td is produced in the rear restricting clutch 28 by the hydraulic control system 32' as shown in FIG. 4b, the rear clutch 28 is engaged and the differential operation of the rear differential 11 is restricted. Thus, the torque is effectively distributed to the rear wheels which grip the ground. The torque is transmitted from a higher speed wheel to a lower speed wheel responsive to the torque Td. When the rear differential 11 is directly engaged, the torque is distributed to the left rear wheel 13L and the right rear wheel 13R at a point P2 of FIG. 4a in accordance with a weight distribution on the rear wheels.

During the four-wheel driving, in the control unit 50, acceleration/driving modes are properly determined in accordance with parameters of lateral acceleration G and longitudinal acceleration G and large steering angle at a low vehicle speed and slipping of the wheels which are detected.

At steady driving where the longitudinal acceleration G is small, a small clutch torque Td is determined as shown in FIG. 3. A signal corresponding to a large duty ratio is applied to the solenoid operated duty control valve 40'. Thus, the restricting torque Td is controlled to be reduced. The rear differential 11 becomes free, thereby improving steady driving and steerability if the lateral acceleration is large.

If the vehicle is accelerated, the longitudinal acceleration G becomes large. Thus, a large torque Td is set so that the small duty ratio D is applied to the solenoid operated valve 40'. The clutch 28 is thus supplied with the oil so that the clutch torque increases so as to restrict the differential operation of the rear differential 11. Consequently, slipping is suppressed, thereby preventing the vehicle from becoming stuck. Thus, running performance of the vehicle is improved.

When the vehicle makes a turn at acceleration, the load on the outside wheel increases in accordance with centrifugal force. Thus, the torque is largely distributed to the outside wheel, thereby insuring the driving power. Since a moment is produced to cause an oversteer, the steering performance is improved. When the vehicle is decelerated to a steady state, the torque Td is reduced to make it possible to easily turn a corner.

If a large steering angle at a low vehicle speed in a steady driving state is determined in accordance with the vehicle speed V and the steering angle $\phi$, a signal corresponding to a maximum duty ratio is applied to the solenoid operated valve 40'. Therefore, the restricting torque Td of the rear clutch 28 is set to zero, thereby preventing tight corner braking. During the traction control by the ABS control, the left rear wheel 13L and the right rear wheel 13R are controlled so as to prevent the tire from locking. When slipping of one of the rear wheels is determined in accordance with the difference between the left rear wheel speed NL and the right rear wheel speed NR, a signal corresponding to a minimum duty ratio is applied to the solenoid operated valve 40'. Consequently, the restricting torque Td is set to a maximum value to lock the differential, thereby enabling the vehicle to easily leave the bad road.

From the foregoing, in the embodiment, various driving conditions such as straight-ahead running and cornering in a steady state or at acceleration are determined in accordance with the longitudinal acceleration G and the lateral acceleration G for controlling the torque for restricting the differential operation. Thus, steerability in the steady state is insured, and acceleration and traction control are improved. Since the driving mode at large steering angles at low vehicle speed is independently determined in accordance with the vehicle speed and the steering angle, the tight corner braking can also be prevented.

Figure 5:
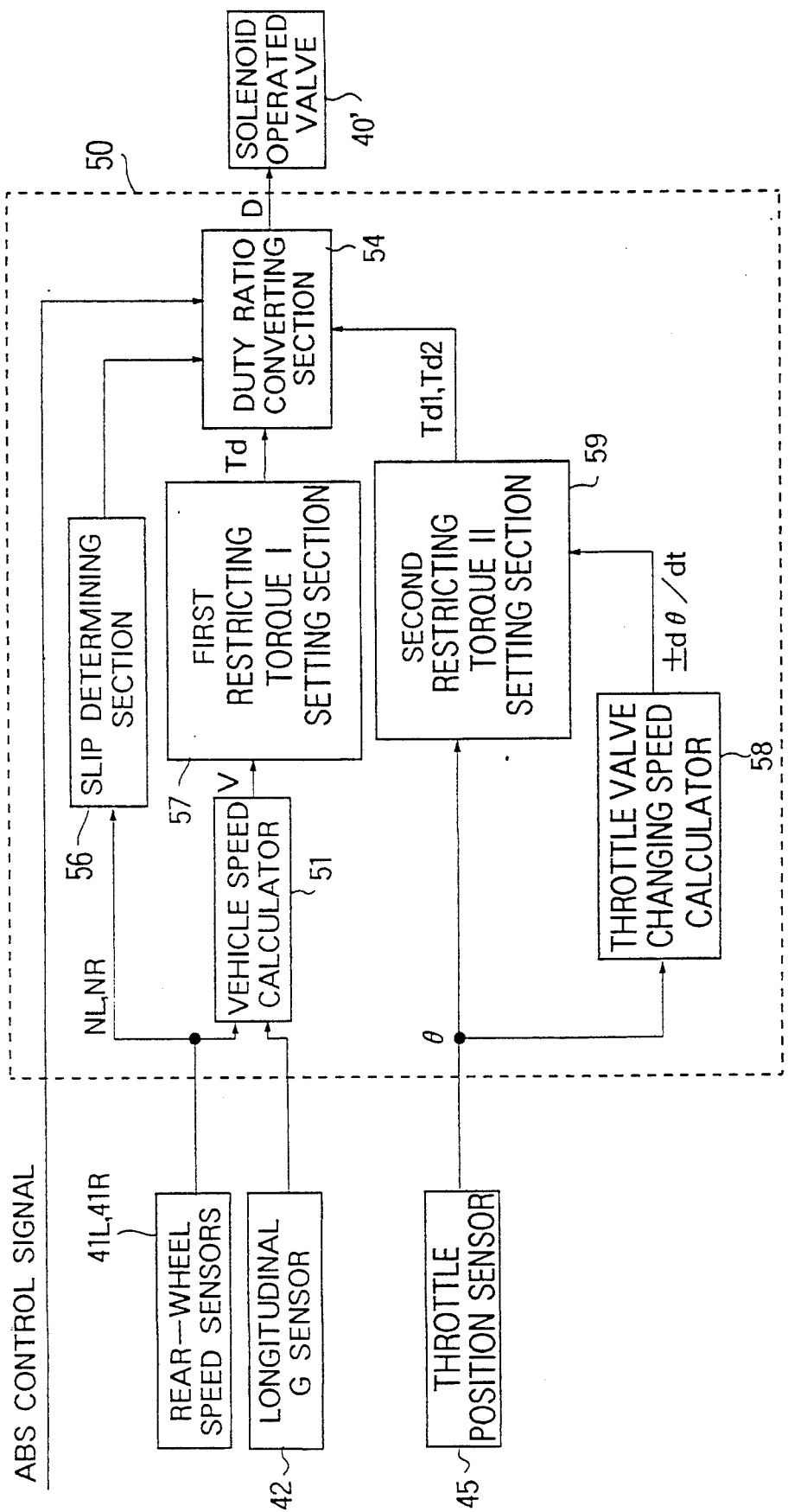
FIG. 5 is a block diagram showing a second embodiment of the present invention.

FIG. 5 shows the second embodiment of the present invention. The control unit 50 has a first restricting torque I setting section 57 which is applied with the vehicle speed V calculated at the vehicle speed calculator 51 in accordance with the rear-wheel speeds NL and NR, and the longitudinal acceleration G. In accordance with the vehicle speed V, the setting section 57 derives a restricting torque TD from a look-up table as shown in FIG. 6a for controlling the torque Td of the rear clutch 28.

In the look-up table, the torque TD is determined to be zero at the low vehicle speed range to reduce the understeer tendency for preventing braking effect at cornering. In a high vehicle speed range, the torque TD is determined to be a predetermined high value for improving the stability. At a middle speed range, the torque TD is determined as an increasing function of the vehicle speed for properly providing understeer tendency, thereby enhancing the driving stability and steerability.

The derived clutch torque TD is applied to the duty ratio converting section 54.

The control unit 50 is further provided with a throttle position sensor 45 for detecting a throttle valve opening degree $\theta$ corresponding to the depression degree of the accelerator pedal of the vehicle. The throttle valve opening degree $\theta$ is applied to a throttle valve opening degree changing speed (rate) calculator 58 and a second restricting torque II setting section 59. The throttle valve opening degree changing speed calculator 58 is provided for accurately detecting acceleration and deceleration in accordance with the acceleration operation by the driver. In the calculator 58, the throttle opening degree $\theta$ is differentiated with time to calculate a throttle valve opening speed rate $d\theta/dt$ and a throttle valve closing speed $-d\theta/dt$. The calculated changing speed (rate)$\pm d\theta/dt$ is applied to the setting section 59.

In accordance with the input signals, the section 59 derives clutch torques Td1 and Td2 from the look-up tables as shown in FIGS. 6b and 6c, respectively.

The restricting torque Td1 of FIG. 6b is determined in accordance with the throttle opening degree $\theta$. It is desired to insure steerability at a small throttle opening degree and to enhance the stability of running behavior at a large throttle opening degree. Thus, the clutch torque Td1 is gradually increased from zero in dependency on the opening degree $\theta$ and rapidly increased thereafter.

The restricting torque Td2 of FIG. 6c is determined in accordance with the throttle valve opening degree changing speed rate $\pm d\theta/dt$ for enhancing the efficiency at rapid acceleration. The clutch torque Td2 is determined as increasing functions of the opening speed (rate) $d\theta/dt$ and the closing speed $-d\theta/dt$ of the throttle valve at predetermined changing speeds and thereafter. Furthermore, in order to prevent the tires from locking at deceleration, the torque Td2 is largely changed in a throttle closing speed range.

The torque Td1 and Td2 are added to obtain a torque Td which is applied to the duty ratio converting section 54.

The operation of the system of the second embodiment will be described hereinafter. First, the operation in dependency on the vehicle speed V is described. When the vehicle speed V changes, at a low vehicle speed range, the torque TD derived from the look-up table of FIG. 6a is set to zero and the corresponding duty ratio signal is applied to the solenoid operated valve 40' so that the clutch torque Td is controlled to zero. Thus, the rear differential 11 becomes free, thereby preferably insuring steerability for preventing the tight corner braking effect at a large steering angle. If the vehicle speed V rises, the vehicle tends to be unstable. In the embodiment, in a middle and high vehicle speed range, the torque Td is increased with the vehicle speed V to increase the understeer tendency. Consequently, tire griping and running behavior at cornering are improved. Furthermore, driving stability at high speed driving and performance against side wind are enhanced.

Second, operation at acceleration and deceleration is described. In a light load range, the restricting torque Td of the rear clutch 28 is controlled to zero in accordance with the restricting torques derived from the look-up tables of FIGS. 6b and 6c, so that the steerability is insured as hereinbefore described. At a slow acceleration, the torque Td is controlled only in accordance with the throttle opening degree $\theta$ shown by the look-up table of FIG. 6b. In the full-throttle opening state, in particular, torque Td is increased to obtain stable driving and large driving torques for the wheels. At a rapid acceleration, the throttle opening speed (rate) $d\theta/dt$ increases. In this state, the second torque Td2 is derived from the look-up table of FIG. 6c and added to the first torque Td1 for obtaining the torque Td. The torque Td is controlled in accordance with the duty signal. Thus, the slipping of the wheels is prevented to improve the traction, thereby enhancing the accelerability. At rapid deceleration by rapidly depressing a brake pedal, the throttle closing speed (rate) $-d\theta/dt$ rises. The torque Td is increased in accordance with the second torque Td2. Thus, the tire is prevented from locking to effect the braking, thereby improving the braking efficiency.

In the second embodiment, the differential operation restricting torque is controlled in a middle and high vehicle speed range, so that the vehicle is driven in an understeer mode, thereby improving stability. The slow or rapid acceleration or deceleration is properly determined in accordance with the parameters of throttle opening degree and throttle opening degree changing speed (rate), thereby improving accelerability and traction control.

Figure 7:
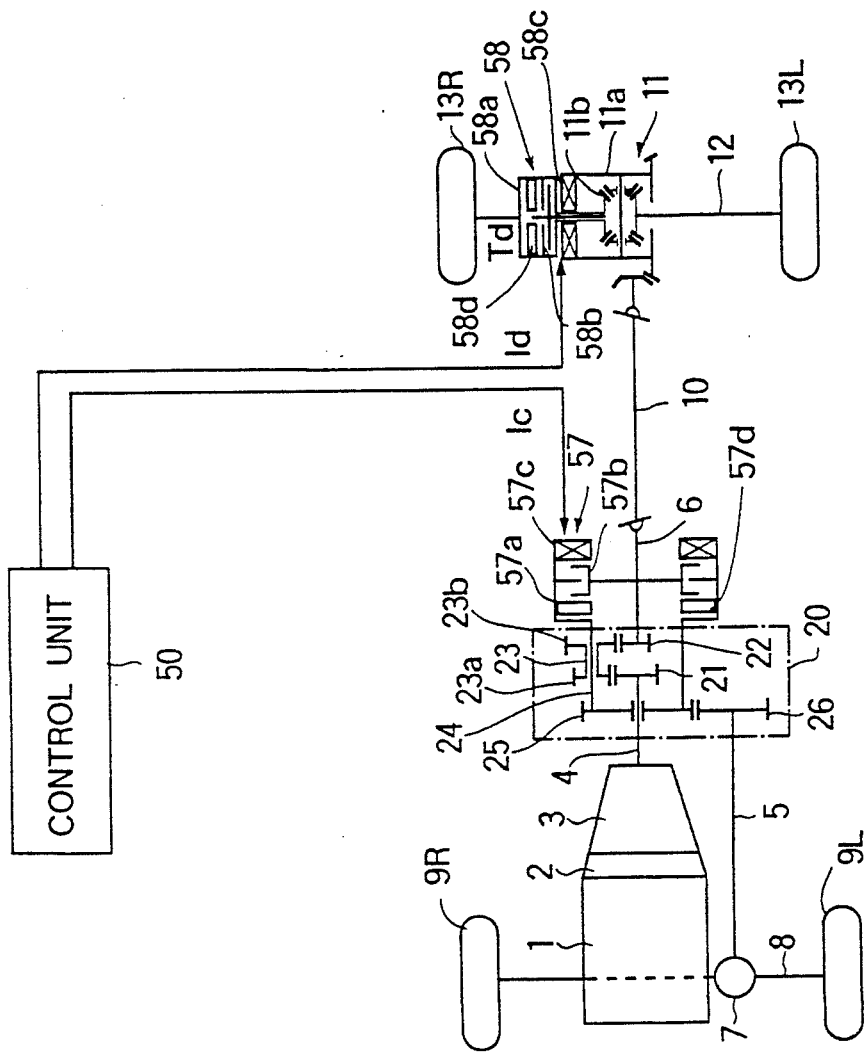
FIG. 7 is a power transmission system showing a third embodiment of the present invention.
Figure 8:
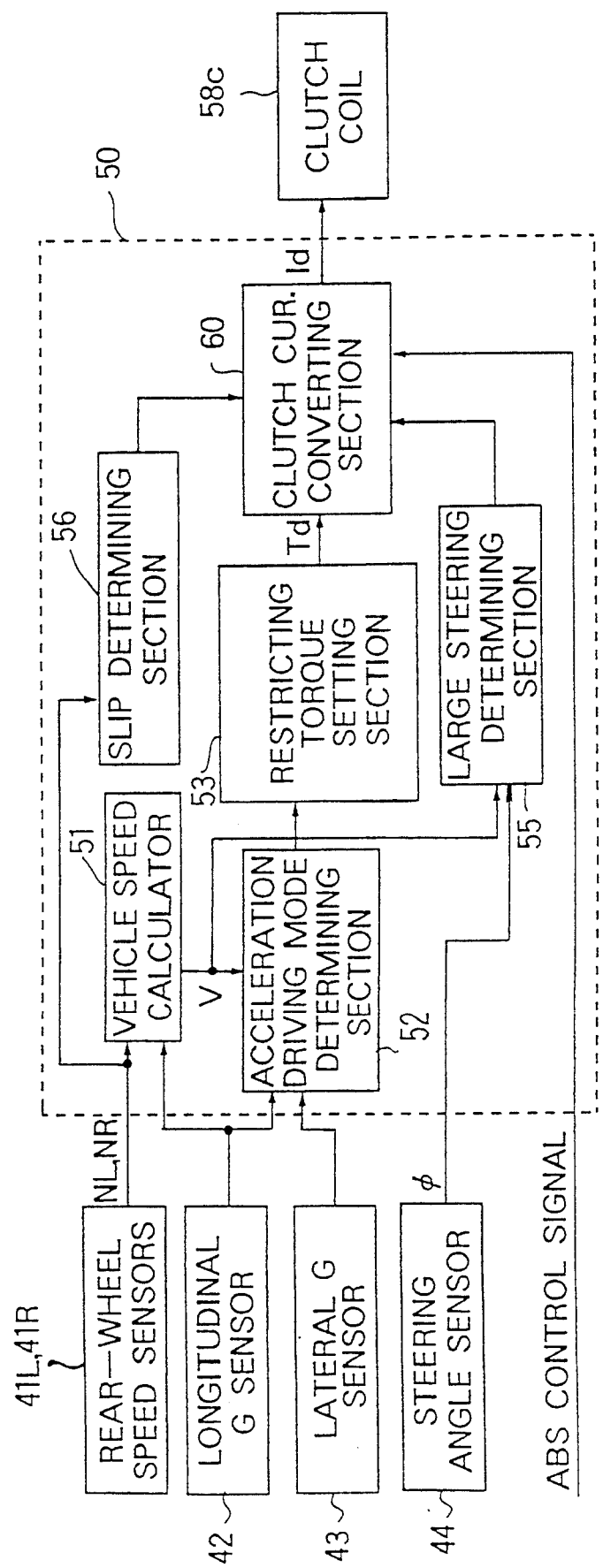
FIG. 8 is a block diagram showing a third embodiment of the present invention.

FIGS. 7 and 8 show a third embodiment of the present invention adapted to an electro-magnetic operated multiple-disk friction clutch instead of the fluid operated multiple-disk friction clutch of the first embodiment. In FIG. 7, electro-magnetic operated multiple-disk friction clutches 57, 58 have coils 57c, 58c and pistons 57d, 58d made from magnetic material. The coil 58c is connected to the control unit 50 and supplied a clutch current calculated in a clutch current converting section 60 in accordance with the driving conditions. The third embodiment does not need a hydraulic circuit and makes it possible to easily adapt to such a transmission which does not provide a hydraulic circuit except a lubricating circuit, as a manual transmission.

Figure 9:
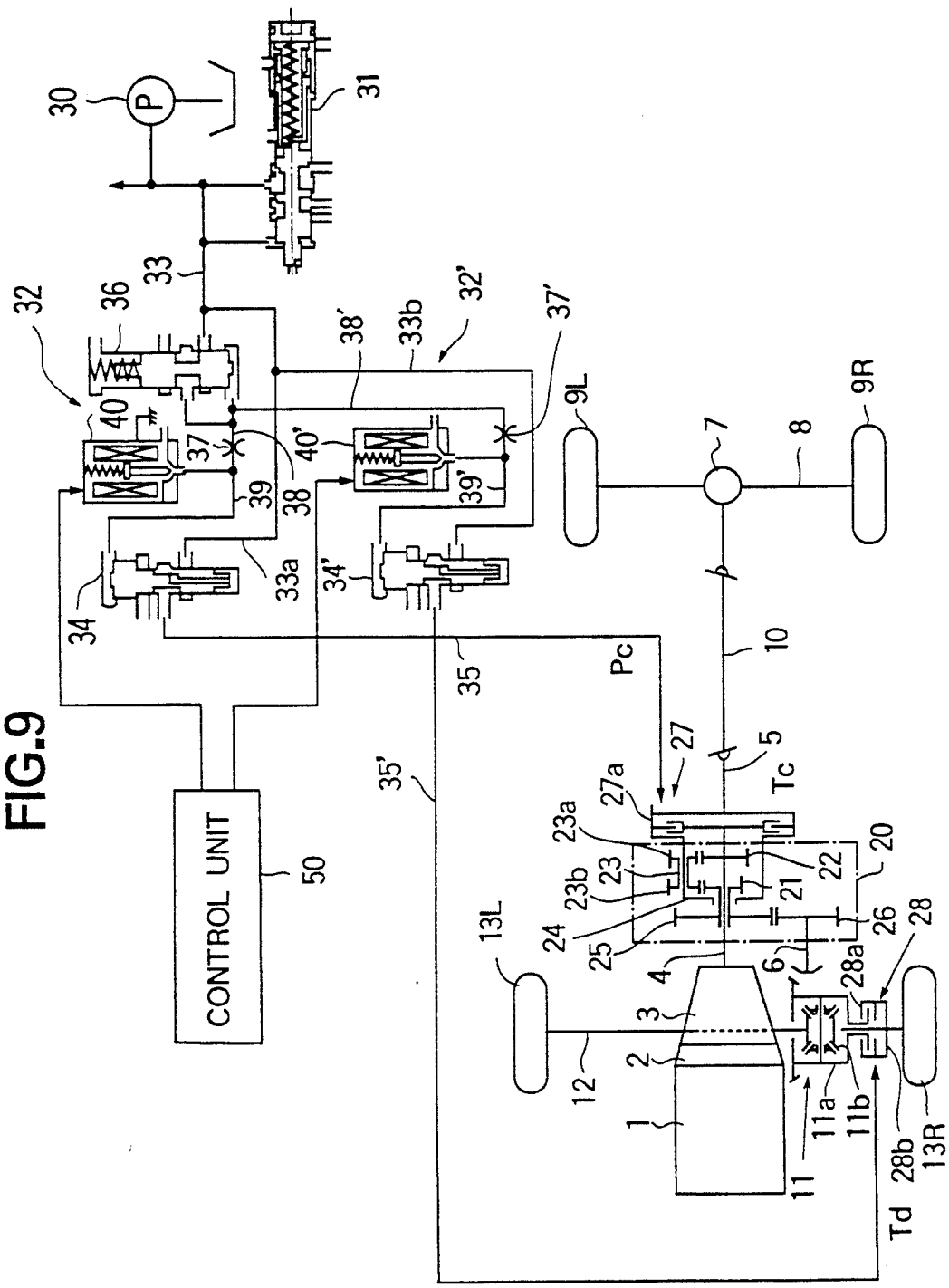
FIG. 9 is a power transmission system for rear engine motor vehicle showing a fourth embodiment of the present invention.

FIG. 9 shows a fourth embodiment of the present invention mounted on a rear engine vehicle.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system for a rear differential mounted on two rear axles which are connected to respective left and right rear drive wheels of a motor vehicle having an engine, and a transmission connected to said engine, an output member of said transmission operatively connected to said differential for transmitting power from said engine to said axles, the control system comprising
    a differential operation restricting clutch connected between one of said wheels and said rear differential and responsive to a control signal for restricting differential operation of said rear differential,
    wheel speed sensors for detecting left and right rear wheel speeds and for generating rear wheel speed signals,
    a longitudinal G-sensor for detecting acceleration in a longitudinal direction of said motor vehicle and for generating a longitudinal acceleration signal, a lateral G-sensor for detecting acceleration in a lateral direction of said motor vehicle and for generating a lateral acceleration signal, and a steering angle sensor for sensing steering angle and for producing a steering angle signal, and the control system further comprises:

vehicle speed calculating means responsive to said rear wheel speed signals and said longitudinal acceleration signal for calculating vehicle speed and for producing a vehicle speed signal;

torque setting means responsive to said vehicle speed signal, said longitudinal acceleration signal and said lateral acceleration signal for setting a restricting torque of said clutch and for producing a restricting torque signal;

slip determining means responsive to said rear wheel speed signals for determining wheel slipping and for producing a slip signal;

steering angle determining means responsive to said vehicle speed signal and said steering angle signal for determining a large steering angle at a low vehicle speed for producing a large steering angle signal; and converting means responsive to said slip signal, said restricting torque signal and said large steering angle signal for setting the control signal of the clutch in order to obtain an optimum control of said clutch so as to improve steady driving, steady steering, acceleration performance and traction control and preventing tight corner breaking;

said clutch being completely engaged at a maximum restricting torque signal so as to provide a torque distribution to said rear wheels in accordance with weight distribution on said rear wheels.

2. The control system according to claim 1, wherein said clutch is completely disengaged at a zero restricting torque signal so as to provide a torque distribution of 50% to each of said rear wheels, improving steerability and driving stability.

3. The control system according to claim 2, wherein the torque distribution varies linearly between 50% to each of said rear wheels and in accordance with said weight distribution on said rear wheels, as said restricting torque signal increases linearly with respect to acceleration and driving conditions between zero and said maximum restriction torque signal.

4. A control system for a rear differential mounted on two rear axles which are connected to respective left and right rear drive wheels of a motor vehicle having an engine, and a transmission connected to said engine, an output member of said transmission operatively connected to said differential for transmitting power from said engine to said axles, the control system comprising a differential operation restricting clutch connected between one of said wheels and said rear differential and responsive to a control signal for restricting differential operation of said rear differential, wheel speed sensors for detecting left and right rear wheel speeds and for generating rear wheel speed signals, a longitudinal G-sensor for detecting acceleration in a longitudinal direction of said motor vehicle and for generating a longitudinal acceleration signal, a lateral G-sensor for detecting acceleration in a lateral direction of said motor vehicle and for generating a lateral acceleration signal, and a steering angle sensor for sensing steering angle and for producing a steering angle signal, and the control system further comprises:

vehicle speed calculating means responsive to said rear wheel speed signals and said longitudinal acceleration signal for calculating vehicle speed and for producing a vehicle speed signal;

torque setting means responsive to said vehicle speed signal, said longitudinal acceleration signal and said lateral acceleration signal for setting a restricting torque of said clutch and for producing a restricting torque signal;

slip determining means responsive to said rear wheel speed signals for determining wheel slipping and for producing a slip signal;

steering angle determining means responsive to said vehicle speed signal and said steering angle signal for determining a large steering angle at a low vehicle speed for producing a large steering angle signal; and converting means responsive to said slip signal, said restricting torque signal and said large steering angle signal for setting the control signal of the clutch in order to obtain an optimum control of said clutch so as to improve steady driving, steady steering, acceleration performance and traction control and preventing tight corner breaking;

said clutch being substantially disengaged when said restricting torque signal is small, said restricting torque signal being small when said longitudinal and lateral accelerations are small, improving steady driving, said restricting torque signal being small when said longitudinal acceleration is small and said lateral acceleration is relatively large, improving steady steering.

said restricting torque signal being large so that said clutch correspondingly engages when said longitudinal acceleration is relatively large and said lateral acceleration is small, improving acceleration at straight-ahead running, suppressing slipping of the rear wheels and improving vehicle running performance, said restricting torque signal being large so that said clutch correspondingly engages when said longitudinal and lateral accelerations are relatively large respectively, improving steering performance and acceleration at steering and insuring driving power to an outside of said rear wheels during steering, said converting means being responsive to said large steering angle signal to effectively provide a zero restricting torque signal, preventing tight-corner braking, and said converting means effectively setting a maximum restricting torque signal so as to completely engage said clutch when a difference between said rear wheel speeds is greater than a predetermined value so that rear wheel slipping abates and traction is improved.

5. The control system according to claim 1, wherein said weight torque distribution is in accordance with dynamic weights on said rear wheels and friction coefficient of a surface of a road on which said wheels contact.

* * * * *